Patented Oct. 12, 1937

2,095,240

UNITED STATES PATENT OFFICE 2,095,240

CHLOROFORM MANUFACTURE

Gerald H. Coleman and Bartholdt C. Hadler, Midland, Mich., assignors to The Dow Chemical Company, Midland, Mich., a corporation of Michigan No Drawing. Application February 13, 1936, Serial No. 63,733

6 Claims. (Cl. 260—165)

This invention concerns an improved method of manufacturing chloroform by reduction of carbon tetrachloride with iron and water.

A commercial method of manufacturing chloroform consists essentially in agitating a mixture of carbon tetrachloride, water, and finely divided iron, whereby the carbon tetrachloride is reduced and chloroform produced in accordance with the equation:—

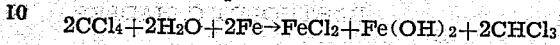

This method involves certain disadvantages. For instance, the reaction is slow and by-products such as hexachloroethane and tetrachloroethylene are usually formed in considerable amount.

We have found that certain derivatives of ammonia, i. e. ammonium, alkylamine, and alkanolamine salts of acids which do not render iron passive, are catalysts for the reaction of carbon tetrachloride with iron and water and that by carrying the reaction out in the presence of such catalyst, the rate of reaction to produce chloroform may be materially increased and the extent of by-product formation decreased. However, corresponding salts of acids which render iron passive, e. g. ammonium nitrate, ammonium molybdate, ammonium phosphate, etc., usually are not effective in promoting the desired reaction and frequently are detrimental to the reaction. The invention, then, consists in the improved method of manufacturing chloroform hereinafter fully described and particularly pointed out in the claims.

Among the various salts which may be employed in our improved method are:—ammonium sulphate, ammonium bisulphate, ferrous ammonium sulphate, ferric ammonium sulphate, ammonium acetate, ammonium tartrate; a hydrochloride or sulphate of ethylamine, diethylamine, triethylamine, propylamine, dipropylamine, butylamine, ethanolamine, diethanolamine, triethanolamine, propanolamine, etc. The ammonium salts are generally more effective than the amine salts as catalysts for the reaction.

In carrying out our method, a mixture of carbon tetrachloride, water, finely divided iron, and a catalytic salt of the class just mentioned, preferably an ammonium salt, is agitated usually at a temperature between 15° and 50° C. in a rotating horizontal cylindrical reactor partially filled with jacks, stones, or other loose objects which aid in the agitation and prevent packing of the iron reactant. However, the reaction may be carried out in other types of reactors and at temperatures outside of the range just stated. Between 0.001 and 0.2 part by weight of the catalyst is preferably employed per part of carbon tetrachloride.

The reaction is usually carried out at atmospheric pressure or slightly above, but may be carried out at higher or lower pressure if desired. For instance, it may be carried out under vacuum, as described in U. S. Patent No. 1,311,329, so as to distill chloroform from the mixture as it is formed.

Agitation of the mixture under the conditions stated above is preferably continued until at least 0.4 chemical equivalent of an inorganic chloride, e. g. 0.4 mole of hydrogen chloride, has been formed by the reaction per mole of carbon tetrachloride employed. The chloroform, unreacted carbon tetrachloride, and by-products such as hexachloroethane, tetrachloroethylene, etc., are then distilled directly from the reaction mixture and purified by redistillation.

For the purpose of illustrating the invention, the following table gives the per cent increase in yield of chloroform, based both on the carbon tetrachloride employed and on the carbon tetrachloride reacted, brought about by employing certain ammonium salts as catalysts for the reduction of carbon tetrachloride with iron and water. In testing each catalyst, two companion experiments were carried out, one in the presence of the ammonium salt and the other in the absence of such salt. In the experiment without a catalyst, a mixture of 1 part by weight of iron, 2 parts of carbon tetrachloride, and 2.4 parts of water was maintained at a temperature of 30° C. and agitated continuously for 24 hours. The mixture was then permitted to settle into an upper aqueous layer and a lower organic layer. The latter was separated from the aqueous layer, and distilled to obtain the chloroform product and unreacted carbon tetrachloride. The experiment using a catalyst was carried out in identical manner except that the ammonium salt given in the table was added to the initial reaction mixture in the amount stated in parts by weight.

Table

| Catalyst | | Percent increase in yield of $CHCl_3$ on $CCl_4$ employed | Percent increase in yield of $CHCl_3$ on $CCl_4$ reacted |
|---|---|---|---|
| Kind | Parts by weight | | |
| Ferrous ammonium sulphate | 0.038 | 26 | 114 |
| Ferric ammonium sulphate | 0.042 | 26 | 100 |
| Ammonium persulphate | 0.032 | 26 | 85 |
| Ammonium bisulphate | 0.016 | 19 | 71 |
| Ammonium sulphate | 0.019 | 17 | 85 |
| Ammonium dichromate | 0.025 | 6 | 32 |
| Ammonium acetate | 0.030 | 10 | 56 |
| Ammonium tartrate | 0.009 | 8 | 26 |

We have also successfully employed other salts as catalysts to increase the yield of chloroform by reaction of carbon tetrachloride with iron and water as follows:—ammonium dichromate, ammonium acetate, ammonium bromide, ammonium iodide, ethylamine hydrochloride, diethylamine hydrochloride, and diethanolamine hydrochloride. Insofar as we are aware, any ammonium, alkylamine, or alkanolamine salt of an acid which does not render iron passive may be employed to catalyze the production of chloroform by the reaction.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of making chloroform by reaction of carbon tetrachloride with iron and water, the step of carrying out the reaction in the presence of an ammonia derivative selected from the class consisting of ammonium, alkylamine, and alkanolamine salts of acids, which acids do not render iron passive.

2. In a method of making chloroform by reaction of carbon tetrachloride with iron and water, the step of carrying out the reaction in the presence of an ammonium salt of an acid, which acid does not render iron passive.

3. In a method of making chloroform, the step which consists in agitating a mixture of carbon tetrachloride, water, comminuted iron, and an ammonium salt of an acid, which acid does not render iron passive.

4. In a method of making chloroform by reaction of carbon tetrachloride with iron and water, the step which consists in carrying out the reaction in the presence of a small proportion of an iron ammonium sulphate.

5. In a method of making chloroform by reaction of carbon tetrachloride with iron and water, the step which consists in carrying out the reaction in the presence of a small proportion of ammonium sulphate.

6. In a method of making chloroform by reaction of carbon tetrachloride with iron and water, the step which consists in carrying out the reaction in the presence of a small proportion of ammonium dichromate.

GERALD H. COLEMAN.
BARTHOLDT C. HADLER.